Patented Nov. 1, 1938

2,135,474

UNITED STATES PATENT OFFICE 2,135,474

RADIOGRAPHIC SUBSTANCE

Albert Parsons Sachs, New York, N. Y., assignor to Zonite Products Corporation, a corporation of Delaware No Drawing. Application July 26, 1933, Serial No. 682,277

8 Claims. (Cl. 167—95)

This invention relates to substances useful in radiography of the internal organs and methods of preparing the same and is herein illustrated as embodied in a substance excretable through the kidneys.

The present invention involves the production and use of certain compounds which are simple substitution derivatives of substances normally excreted by the body. For example, benzoic acid or compounds which are broken down into benzoic acid or benzoates occur normally in the diet of many animals, including man. The organism generally disposes of this benzoic acid or benzoate by coupling it or detoxifying it with another substance present in the body, namely, glycine, a simple amino-acid, to yield a detoxification product, hippuric acid, which is highly soluble in the form of its sodium salt and is eliminated by the kidneys in the urine as a soluble hippurate.

Animal experiments have shown that certain derivatives of benzoic acid are eliminated by the animal in its urine as derivatives of hippuric acid.

Hippuric acid itself when introduced into the animal system, for example, is eliminated by the urine with great rapidity.

It has long been known that substances containing substantial percentages of the heavy halogen iodine and, to a lesser extent, the halogen bromine, are opaque to X-rays and cast shadows under X-ray illumination, and substances have been prepared which are excreted by the kidneys and which contained enough iodine to cast satisfactory shadows. But the substances hitherto used have been iodine derivatives of compounds not normally found in the human or animal body. They throw upon the kidneys the burden of excreting new types of compounds and these substances have been regarded by many radiographers as dangerous, in that no extensive experience is available with these types of compounds and in addition in some instances alarming or detrimental symptoms have been observed.

According to the present invention these and other difficulties are overcome by the use of substances which are the normal products of detoxification within the body or simple derivatives thereof. Rapid elimination and high concentration in the kidneys are thus assured. A substance which is the iodine, bromine, or iodobromine derivative of a substance normally excreted by the desired organ, such as the kidney, is administered to the subject, the man, woman or child, for example, the radiograph is taken within a few minutes and the subject remains unaffected by the administration of the above mentioned substance. The substance described in detail below has diagnostic value but no identifiable specific therapeutic effect. It is non-toxic and without any effect on any of the known functions of the organisms.

The form of the invention herein discussed in detail also has several other advantages. The iodine and/or bromine present is in the non-ionic form in the substance, and is so firmly bound that no splitting off of halogen occurs in the sterilization process or in the human body. Thus the substance in solution yields no iodine or bromine ions and it has been found that it can be safely administered to persons for whom the use of ionic iodine or bromine is contraindicated as, for example, in the case of tubercular patients. The substance herein discussed in detail is easily soluble in less than its own weight of water, is non-toxic in doses far greater than those required in radiography, is permanent or stable and is neutral in solution and in the body, and is capable of being prepared and sold or distributed in stable, sterile solution ready for use. It is moreover eliminated by the kidneys so rapidly that successful radiographs have been taken within a few minutes after administration. Thus unusual conditions such as non-functioning or malformed kidneys or pathological affections of the kidney are clearly shown on the X-ray plate. Because the substance is the simple halogen derivative of a substance which the body generates and normally excretes, namely, hippuric acid, save for the introduction of the non-ionic iodine and/or bromine, the radiograph shows a kidney functioning in its usual manner on a type of compound which is normally present in the body. In other words, the excretion of the sodium orthoiodohippurate does not alter the functioning of the kidneys, and the picture obtained is thus a true picture unaffected by any action of the added substance.

To obtain these and other advantages a very pure sodium orthoiodohippurate was prepared and it was found that aqueous solutions of this substance could be prepared containing more than 50% of the neutral salt.

A solution of 20 grams of sodium orthoiodohippurate in 40 cc. of solution was administered intravenously to a patient suffering from renal tuberculosis without any special previous preparation of the patient and a radiograph was taken within ten minutes. This showed one kidney and its ureter as normal in appearance and functioning and the other non-functioning. The patient suffered no adverse reaction.

An intravenous injection of 20 grams of sodium orthoiodohippurate in 40 cc. of solution was given one patient who had had renal pain and hematuria; his urine showed microscopic crystals. In ten minutes after the injection an X-ray photograph was taken showing the outline of the kidney, ureters and bladder with full details of the structure of the calyx of the kidney. No ill effects whatever were felt. There was slight generalized warmth and the patient was quite capable of walking about at all times after the injection was made.

These X-ray exposures lasted one second, the same length of exposure that is ordinarily used to secure a radiograph of any part of the body. Other radiographs were taken of the same individual at intervals and showed a sufficiently clear picture within a period extending from the time when the first plate was taken to periods extending well over two hours.

Tubercular patients, patients with various diseases affecting the kidneys or other organs have been similarly treated and radiographed and diagnosed without ill effects in any case whatsoever. Similar injections have been made in rabbits, dogs, guinea pigs and rats and satisfactory radiographs have been obtained without ill effects in any case.

It is not essential that the halogen derivative be administered intravenously, nor by way of mouth. It may also be used in the making of a retrograde pyelogram and will have no adverse effect on the kidney or the urinary passages because it is a simple derivative of substances normally excreted by the kidney. Also sodium orthoiodohippurate may be administered orally in the form of dry powder or solution directly or in capsule or by stomach tube.

These substances may also be used for the X-raying of other organs and tissues, as for example, the sinuses into which a solution of sodium orthoiodohippurate may be injected; in such a case a clear outline of the sinus will show on the X-ray plate.

It has proved difficult and almost useless to attempt to purify the sodium orthoiodohippurate when prepared by the procedures ordinarily used for obtaining similar compounds, even though very pure raw materials were used as a starting point.

By the following procedure, an easily purified product was obtained even though crude orthoiodobenzoic acid was used as the starting point. The orthoiodobenzoic acid may be prepared by any convenient method and need not be especially purified or pure.

For example, anthranilic acid (orthoamidobenzoic acid) was converted to orthoiodobenzoic acid by the well known method of diazotizing and treating with sodium or potassium iodide, yielding a crude dark product contaminated with iodine. It has proved possible and even advantageous to defer any purification of this material to a later step.

This crude orthoiodobenzoic acid was converted to orthoiodobenzoyl chloride by suitable treatment with phosphorus pentachloride or sulfuryl chloride. The acid chloride thus obtained was purified by fractional distillation at an absolute pressure of 1 to 3 mm. of mercury and at a temperature below 120° C. A water-white orthoiodobenzoyl chloride of high melting point and absolute purity was thus obtained. This purification of the orthoiodobenzoyl chloride was essential to obtaining a high yield of very pure product.

An easily purified final product was then obtained by coupling such pure orthoiodobenzoyl chloride with easily obtained pure glycine by the well known Schotten-Baumann reaction in which an alkaline solution of the pure glycine in slight excess is permitted to react with the pure orthoiodobenzoyl chloride at a temperature preferably below 50° C., as higher temperatures tend to the formation of colored by-products and the production of some orthoiodobenzoic acid which contaminates the final product. The reaction product obtained as described above is a solution of sodium chloride and sodium orthoiodohippurate containing only the slightest amounts of impurities which are easily removed in the subsequent procedure.

The reaction mixture was filtered and orthoiodohippuric acid separated out by treating the solution with the exact amount of dilute pure hydrochloric acid solution. The product after standing was filtered and washed with distilled water until free from sodium chloride and any small excess of hydrochloric acid used in the precipitation.

The washed pure orthoiodohippuric acid was suspended in water and the exact amount necessary of pure sodium hydroxide, sodium carbonate or sodium bicarbonate theoretically necessary was added. The resultant solution was carefully tested and the correct pH value necessary for absolute neutrality obtained by adding either some additional orthoiodohippuric acid or more of the alkali, and the solution was evaporated either to dryness at temperatures below 100° C. using at the end a high vacuum to facilitate the drying or by spraying the solution, or the solution was evaporated to a constant predetermined concentration and used in the form of a solution without previous evaporation to dryness.

The product was so stable that it remained unchanged as to color and reaction when the solution was sterilized at 25 pounds pressure steam for 30 minutes in an autoclave in the usual manner.

Di-iodohippuric acid salts and bromoiodohippuric acid salts have also been prepared and are adapted to be excreted by the kidneys and to cast shadows in a beam of X-rays. Thus, di-iodohippuric acid and its sodium salt were prepared by the following series of reactions: ortho-toluidine was directly iodinated, acetylated, oxidized, deacetylated, diazotized in the presence of potassium iodide. The product is di-iodobenzoic acid with a melting point of 175° C. and an equivalent weight of 370 as compared to a theoretical equivalent weight of 374. Iodobromobenzoic acid was prepared in an analogous manner. The di-iodobenzoic acid prepared as above was converted to the acid chloride without purification by distillation and coupled with glycine by the Schotten-Baumann reaction to yield a di-iodohippuric acid. This proved very resistant to purification. The equivalent weight as determined by titration with standard caustic soda solution was only 416 indicating some impurity; the solution of the sodium salt was coffee colored. The sodium salt contained 5.19% sodium (theoretical 5.08%). The melting point of the acid was 195.7° C. The product is o, p-di-iodobenzoylglycine or o, p-di-iodohippuric acid.

A number of of compounds formed by the interaction of o-iodobenzoyl chloride and amino-acids were prepared, purified, analyzed, and tested for toxicity by the intravenous injection of sterilized solutions of the sodium salts. These compounds were: o-iodobenzoyl-dl-α-amino-n-valeric acid, o-iodobenzoyl-d-glutamic acid, o-iodobenzoyl-dl-α-amino-phenylacetic acid and o-iodobenzoyl-5-aminosalicylic acid.

These were prepared as follows:

o-iodobenzoyl chloride and dl-α-amino-n-valeric acid were coupled by the Schotten-Baumann reaction, and the free acid was recrystallized from chloroform until a constant melting point of 149.6° C. was obtained. The product was pure white. The sodium salt contained 6.22% sodium (theory 6.23%). It was deliquescent. 2.4 grams dissolved in 12 cc. of water was injected intravenously into a rabbit of 2.8 kilos weight. There was a violent reaction but the animal recovered completely.

o-iodobenzoyl chloride and d-glutamic acid were coupled by the Schotten-Baumann reaction, and the free acid was washed with boiling chloroform to a constant melting point of 180.3° C. The product was pure white in color. The sodium salt was prepared by neutralizing with pure sodium bicarbonate to a pH of 6.9, drying the solution at 60° C. and finishing in vacuum at 50° C. The sodium salt is deliquescent. On redissolving a few crystals in a small amount of water the pH was 6.9. The sodium content was 10.59% (theory 10.92%). 2.4 grams in 12 cc. of water were injected intravenously into a rabbit of 2.8 kilos weight. There was no apparent reaction.

o-iodobenzoyl chloride and dl-α-aminophenyl-acetic acid were coupled by the Schotten-Baumann reaction, and the free acid washed with boiling chloroform until a constant melting point of 176.2° C. (uncorrected) was obtained. Titration with standard caustic soda solution indicated an equivalent weight of 381-382 (theory 381). 1.85 grams were injected intravenously into a rabbit of 2.8 kilos weight. There was a very violent reaction and prostration occurred, but the animal recovered.

o-iodobenzoyl chloride and 5-aminosalicylic acid hydrochloride were coupled by the Schotten-Baumann reaction. The product had an equivalent weight of 379 (theory 383) and melted at 259° C. (uncorrected) with decomposition. The sodium salt with a pH of 6.9–7.0 was prepared. 1.3 grams in 6.5 cc. injected intravenously into a rabbit weighing 2.6 kilos caused death in 30 minutes.

From the foregoing it will be clear that some of these substances may be safely administered by intravenous injection, but that a few of them at least are toxic and should therefore not be intravenously injected. They are adapted, however, to cast the desired shadows and may therefore be introduced directly into a cavity, such as sinuses, of the body for radiographic purposes.

Having thus described certain embodiments of the invention what is claimed is:

1. A composition for use in the radiography of internal organs, comprising a pharmaceutically pure alkali metal salt of a derivative of hippuric acid containing non-ionic heavy halogen.

2. A substance for use in the radiography of internal organs comprising a halogenated hippurate.

3. A substance for use in the radiography of internal organs comprising sodium orthoiodohippurate.

4. A composition for use in the radiography of internal organs, comprising the sodium salt of di-iodo-hippuric acid.

5. A composition for use in the radiography of internal organs, comprising the sodium salt of bromo-iodo-hippuric acid.

6. A composition for use in the radiography of internal organs, comprising the sodium salt of one or more of the following acids: di-iodo-hippuric; di-bromo-hippuric; di-bromo-iodo-hippuric; ortho-iodo-hippuric; o-iodobenzoyl-dl-α-amino-n-valeric; o-iodobenzoyl-d-glutamic; o-iodobenzoyl-dl-α-amino-phenylacetic; and o-iodobenzoyl-5-aminosalicylic.

7. In the method of taking an X-ray picture of an organ or cavity of the body, such as the urinary tract, the improvement which comprises introducing a halogenated hippurate into the body in amount adapted to render the urinary tract opaque to X-rays, and then taking an X-ray picture of the urinary tract when the halogenated hippurate reaches the same.

8. In the method of taking an X-ray picture of an organ or cavity of the body, such as the urinary tract, the improvement which comprises introducing sodium orthoiodohippurate into the body in amount adapted to render the urinary tract opaque to X-rays, and then taking an X-ray picture of the urinary tract when the sodium orthoiodohippurate reaches the same.

ALBERT PARSONS SACHS